（12） United States Patent
Kapelner

(10) Patent No.: US 8,156,274 B2
(45) Date of Patent: Apr. 10, 2012

(54) DIRECT SLAVE-TO-SLAVE DATA TRANSFER ON A MASTER-SLAVE BUS

(75) Inventor: Jordan S. Kapelner, Long Beach, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 163 days.

(21) Appl. No.: 12/364,175

(22) Filed: Feb. 2, 2009

(65) Prior Publication Data

US 2010/0199007 A1    Aug. 5, 2010

(51) Int. Cl.
*G06F 13/00* (2006.01)
*G06F 3/00* (2006.01)

(52) U.S. Cl. ............ 710/110; 710/36; 711/103
(58) Field of Classification Search .......... 710/110, 710/36; 713/2; 711/103
See application file for complete search history.

(56) References Cited

U.S. PATENT DOCUMENTS

| | | | | |
|---|---|---|---|---|
| 4,935,868 | A * | 6/1990 | DuLac | 710/305 |
| 6,363,444 | B1 * | 3/2002 | Platko et al. | 710/110 |
| 7,058,732 | B1 | 6/2006 | Hauck | |
| 7,293,126 | B2 * | 11/2007 | Liao et al. | 710/110 |
| 7,378,873 | B1 | 5/2008 | Tang et al. | |
| 7,428,610 | B2 * | 9/2008 | Pedersen et al. | 711/103 |
| 7,502,963 | B2 | 3/2009 | Nair | |
| 7,979,625 | B2 * | 7/2011 | Le et al. | 711/103 |
| 2004/0078500 | A1 * | 4/2004 | Pezzini | 710/36 |
| 2005/0240697 | A1 * | 10/2005 | Liao et al. | 710/110 |
| 2006/0143431 | A1 * | 6/2006 | Rothman et al. | 713/2 |
| 2007/0067528 | A1 * | 3/2007 | Schaffer et al. | 710/116 |
| 2009/0259785 | A1 * | 10/2009 | Perry et al. | 710/110 |

OTHER PUBLICATIONS

Robot Electronics, Using the I2C Bus, 2007.*
Atmel. Avr 8 bit risc controller application note, Rev. 258c , Jul. 2008.*

* cited by examiner

*Primary Examiner* — Paul R Myers
*Assistant Examiner* — Christopher a Daley
(74) *Attorney, Agent, or Firm* — Meyertons Hood Kivlin Kowert & Goetzel, P.C.; Jeffrey C. Hood; Erik A. Heter

(57) ABSTRACT

A method and system for transferring data between two slave devices. A system includes a master device and first and second slave devices coupled to the master device by a peripheral bus. The master device is configured to configure the first slave device as a source for a read operation, configure the second slave device as a target for a write operation, provide a clock signal to both the first slave device and the second slave device, and initiate a read operation of the first slave device. Initiation of the read operation causes the first slave device to provide data onto the peripheral bus. Responsive to the master device initiating the read operation, the second slave device receives the data provided on the peripheral bus by the first slave device. The master device is configured to ignore the data provided on the peripheral bus by the first slave device.

12 Claims, 4 Drawing Sheets

DIRECT SLAVE-TO-SLAVE DATA TRANSFER ON A MASTER-SLAVE BUS

FIELD OF THE INVENTION

This invention relates to peripheral buses, and more particularly, to transferring data between devices on peripheral buses.

DESCRIPTION OF THE RELATED ART

Various types of peripheral buses implement a master-slave configuration. In such buses, a master device controls data transfer to or from slave devices. One such bus type is known as the serial peripheral interface (SPI) bus. In an SPI bus, operations may occur with one master device and one or more slave devices. Data transfer may occur between the master device and either of the slave devices. Furthermore, data transfer may be performed in a full duplex mode wherein a master device writes data to a slave device while concurrently reading data from the slave device.

In the SPI protocol, the master device may also effect data transfer between two slave devices by directly reading data from a first slave device, and then writing the data to a second slave device. In order to perform this operation, the master device may select the first slave device from which data is to be read by asserting a chip select signal thereto. The master device sets a starting address and may also set the device up for auto-increment operation (i.e. the addresses increment automatically without further addresses being sent from the master device). The master device then begins sending a clock signal to the first slave device. The data is read from the first slave device and transferred over a data path to the master device. A buffer in the master device then stores the data. Once all the data is read, or the buffer is full, the master device de-selects the first slave device and then enables the chip select signal to the second slave device. The master device then sends the clock signal to the second slave device and begins sending data. This operation may continue until the buffer is empty or the data transfer is complete. If the amount of data to be transferred exceeds the buffer size, then the operation above is repeated until all data required to complete the transfer has been read from the first slave device and written to the second slave device.

SUMMARY OF THE INVENTION

A method and apparatus for transferring data between two slave devices is disclosed. In one embodiment, a system includes a master device coupled to a peripheral bus, a first slave device coupled to the peripheral bus, and a second slave device coupled to the peripheral bus. The master device is operable to configure the first slave device as a source for a read operation, configure the second slave device as a target for a write operation, and provide a clock signal to both the first slave device and the second slave device. The master device is further operable to initiate a read operation of the first slave device, wherein initiating a read operation causes the first slave device to provide data onto the peripheral bus. Responsive to the master device initiating the read operation, the second slave device is configured to receive the data provided on the peripheral bus by the first slave device. The master device is configured to ignore the data provided on the peripheral bus by the first slave device. Thus the first slave device responds to the master device read operation and believes it is providing data to the master device. However, in one embodiment the master device actually ignores this data, and the second slave device has been configured to receive this data placed onto the bus.

One embodiment relates to a method for performing data transfer in a system comprising a master device, a first slave device, and a second slave device coupled together by a peripheral bus. The method includes configuring, by the master device, the first slave device as a source of data for a read operation. The method further includes configuring, by the master device, the second slave device as a target for performing a write operation. The master device may then provide a clock signal to the first slave device and the second slave device and may initiate a read operation of the first slave device. The first slave device provides data onto the peripheral bus in response to the read operation initiated by the master device, and the second slave device receives the data provided on the peripheral bus by the first slave device responsive to the master device initiating the read operation. The master device is configured to ignore the data provided on the peripheral bus by the first slave device.

BRIEF DESCRIPTION OF THE DRAWINGS

Other aspects of the invention will become apparent upon reading the following detailed description and upon reference to the accompanying drawings in which.

Figure 1:
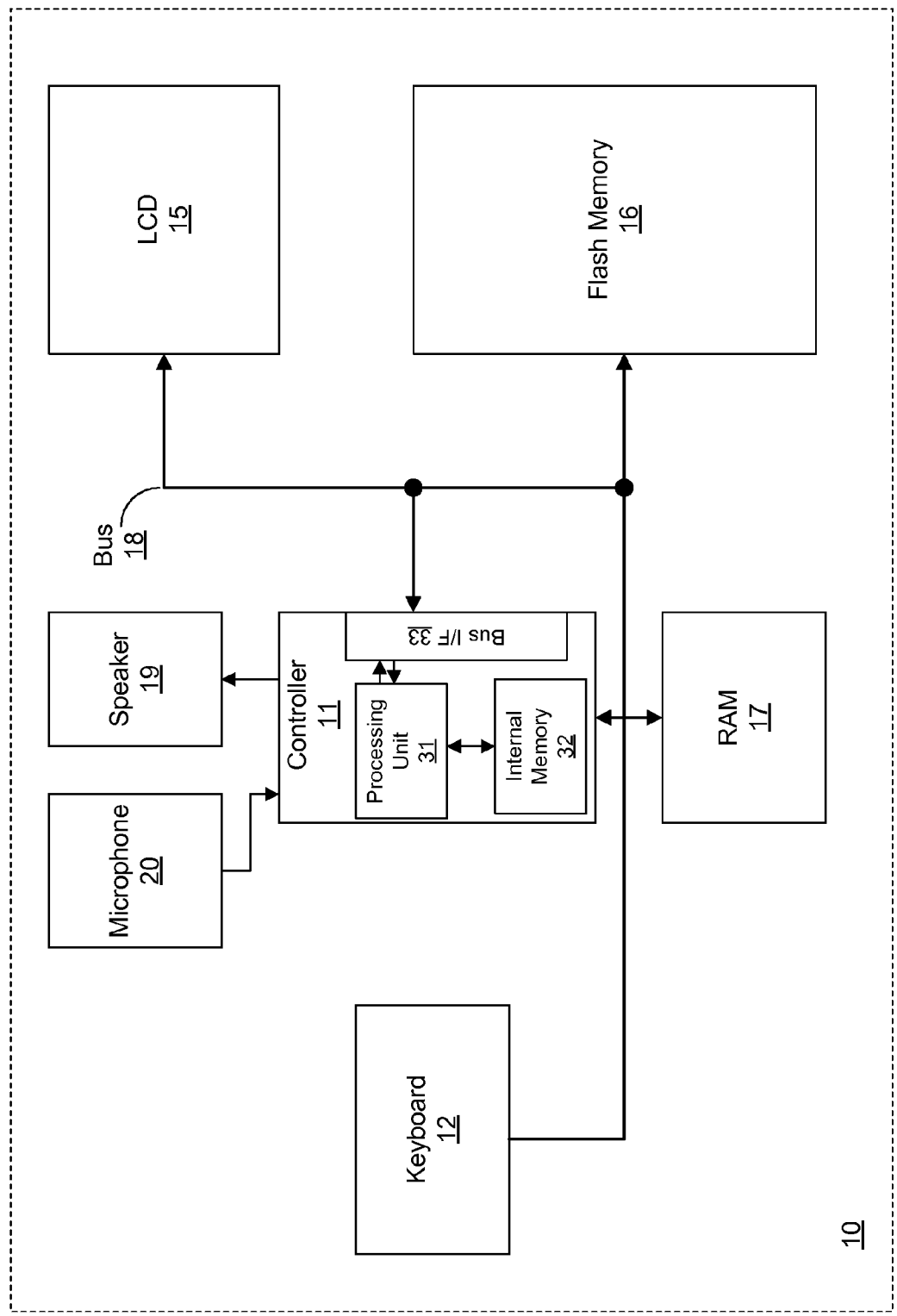
FIG. 1 is a block diagram of one embodiment of an electronic system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of an electronic system is shown. Electronic system 10 may be one of a number of different types of electronic systems. In one embodiment, electronic system 10 may be a handheld device such as a cellular telephone, personal digital assistant (PDA), combination of the previous two, or other type of wireless communications devices. In other embodiments, electronic system 10 may also be a desktop personal computer, a laptop computer. In general, electronic system 10 may be any type of electronic system which may include various components shown in the drawing, including controller 11, flash memory 16, and liquid crystal display (LCD) 15. Various embodiments of electronic system 10 do not necessarily need to include all of the other components shown (e.g., microphone 20), while some embodiments may include other components that are not shown here (e.g., microprocessors, bus bridge units, etc.).

In the embodiment shown, electronic system 10 includes a controller 11 which may perform a number of different control functions. Controller 11 may be one of a number of different types of microcontrollers suitable to perform control functions for the various other components shown. In this embodiment, controller 11 is coupled to receive keystroke inputs from a keyboard 12 via peripheral bus 18, and may provide the functionality of a keyboard controller. Controller 11 is also configured to receive audio inputs from microphone 20. Controller 11 may be configured to process audio signals and provide audio signal outputs to speaker 19. In some embodiments, a separate audio processing unit may be present between controller 11 and speaker 19. Controller 11 in the embodiment shown is also coupled to random access memory (RAM) 17, which may be used to store information during the operation of electronic system 10. RAM 17 may be implemented using dynamic RAM (DRAM), static RAM (SRAM), or a combination thereof.

Controller 11 in this embodiment includes a processing unit 31, an internal memory 32, and a bus interface 33. Processing unit 31 may include various types of combinational and sequential logic circuitry that enables the execution of instructions provided thereto. In one embodiment, instructions to be executed by processing unit 31 may be stored in internal memory 32. Internal memory 32 may include non-volatile memory, volatile memory, or various combinations thereof. Instructions that are to be executed by processing unit 31 may be stored in internal memory 32, either in non-volatile or volatile storage. In addition, instructions that are to be executed by processing unit 11 may be stored elsewhere (e.g., in RAM 17).

In the embodiment shown, controller 11 is coupled to a flash memory 16, an LCD 15, and keyboard 12 via a peripheral bus 18. Bus interface unit 33 provides an interface to peripheral bus 18 from controller 11 in the embodiment shown. Peripheral bus 18 may be a bus that operates in a master slave configuration. In this particular instance, controller 11 may be a master device, while LCD 15, flash memory 16, and keyboard 12 are slave devices. In one embodiment, peripheral bus 18 may be a serial peripheral interface (SPI) bus, which is a bus wherein a single master device may be coupled to one or more slave devices. However, embodiments wherein other types of buses may be used to implement peripheral bus 18 are possible and contemplated.

Flash memory 16 may be a non-volatile memory that may be used to store certain types of information that is necessary or desirable to save even after electronic system 10 is powered off. For example, if electronic system 10 is a PDA, information stored in flash memory 16 may include user-entered contact lists. In another embodiment, if electronic system is a cellular telephone, flash memory 16 may be used to store phone numbers. In general, flash memory 16 may be utilized to store any type of information that it is necessary or desirable to save from one use of electronic system to the next. Flash memory 16 may also be used to store some system critical information, including program instructions required for startup or post-startup operation, attributes of the electronic system 10 (e.g., the phone number in the case where it is a cellular telephone), and so forth. Moreover, multiple instances of a flash memory may be present in various embodiments of electronic system 10.

LCD 15 may be used to provide a visual display of various information to be output from electronic system 10. For example, if electronic system 10 is a cellular telephone, LCD 15 may be used to display a phone number of an incoming call or of an outgoing call. In embodiments where electronic system 10 may be used to send or receive electronic mail, LCD 15 may be used to display messages, lists of incoming messages (e.g., an 'inbox'), lists of sent messages, and so forth. In general, LCD 15 may provide a display for any particular type of information that may be processes or utilized by electronic system 10.

Figure 2:
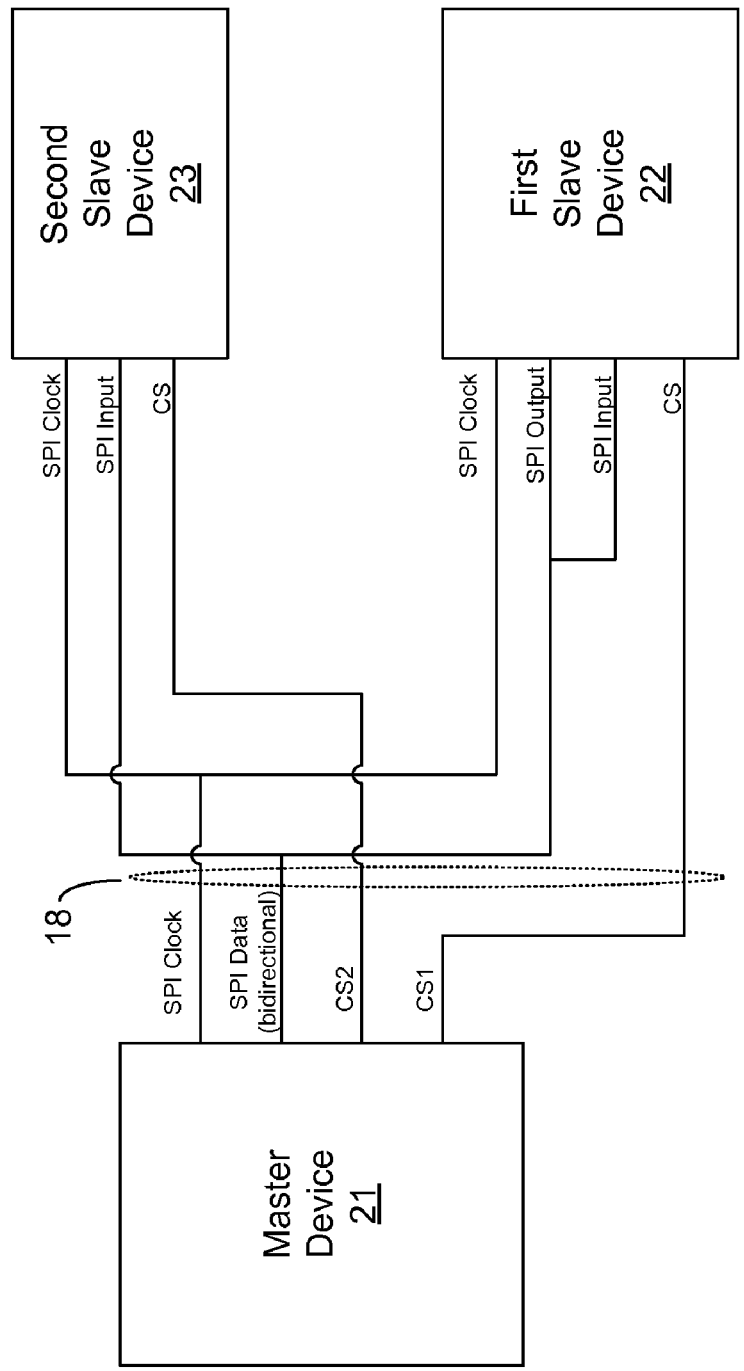
FIG. 2 is a block diagram of one embodiment of an arrangement of a master device and two slave devices are coupled to a peripheral bus.

Turning now to FIG. 2, a block diagram of one embodiment of an arrangement of a master device and two slave devices are coupled to a peripheral bus. In the embodiment shown, system 20 includes a master device 21, a first slave device 22 and a second slave device 23 coupled together by a bus 18. In one embodiment, master device 21, first slave device 22, and second slave device 23 are analogous to controller 11, flash memory 16, and LCD 15 of FIG. 1. However, embodiments utilizing other types of master and slave devices are possible and contemplated. The number of slave devices coupled to master device 21 may vary from one embodiment to the next, and there is no particular limit on the number of slave devices that may be coupled to peripheral bus 19. Thus, embodiments utilizing a different number of slave devices (e.g., 3 or more) are also possible and contemplated.

In the embodiment shown, second slave device 23 includes an SPI input, but does not include an SPI output (in contrast to first slave device 22). Accordingly, information may be transferred to, but not from, second slave device 23. In contrast, data may be transferred to or from first slave device 22, since it includes both an SPI input and an SPI output.

As previously noted, in one embodiment bus 18 may be an SPI bus. Accordingly, in the embodiment shown, bus 18 includes a signal path for an SPI clock, and a bi-directional SPI data line. In this particular embodiment, select connections are provided for the slave devices. These select connections are unique for each slave device in this embodiment. Master device 21 is configured to assert an enable signal on output CS1 in order to select first slave device 22, and is configured to assert another enable signal on output CS2 in order to select second slave device 23.

In some cases, it may be desirable or necessary to transfer data from one slave device to another slave device. For example, of system 20 is implemented in a cellular telephone, an incoming call may prompt the transfer of phone number data from a flash memory to an LCD (e.g., as shown above in FIG. 1). In the embodiment shown, this may be accomplished without first writing data to a buffer in master device 21.

In order to perform a slave-to-slave data transfer from first slave device 22 to second slave device 23, master device 21 is configured to assert the select inputs for both first slave device 22 and second slave device 23. Master device 21 may then send information to the SPI input of first slave device 22 indicating that it is to be the source of data for performing a read operation (i.e. data is to be transferred from first slave device 22). Master device 21 may also send information to the SPI input of second slave device 23 indicating that it is to be a target of a write operation (i.e. data is to be transferred to/received by second slave device 23).

Master device 21 may also provide a start read address to first slave device 21, indicating a starting address of a buffer or memory therein from which data is to be transferred. Similarly, master device 21 may also provide a start write address to second slave device 22, indicating a starting address therein where data is to be written to or otherwise provided. Master device 21 may also provide configure both first slave device 22 and second slave device 23 to operate in an auto increment mode. When first slave device 22 and second slave device 23 are both operating in the auto increment mode, addresses are automatically incremented during the data transfer, thus saving master device 21 the extra overhead of sending read and write addresses for each unit of data to be transferred.

In addition to providing select signals and configuring the devices as noted above, master device 21 provides a clock signal to first slave device 22 and second slave device 23 via the SPI clock signal connection shown in the drawing. The clock signal provided by master device 21 may be used to synchronize the data transfer between the slave devices. Generally speaking, master device 21 may be configured to provide the SPI clock signal for any type of information transfer on bus 18.

Once master device 21, first slave device 22, and second slave device 23 are properly configured, the transfer of data may begin. First slave device 22 may provide data from its SPI output onto the SPI data lines. The data may be conveyed to both second slave device 23 as well as master device 21. However, master device 21 may be configured to ignore the data, effectively performing dummy reads from first slave device 22. On the other hand, second slave device 23 is the actual target of the data transfer in this particular example, and thus the data transferred on bus 18 is obtained by the second slave device 23. As noted above, the data transfer may be synchronized with a clock signal provided by master device 21, while both first slave device 22 and second slave device 23 are configured to auto increment the addresses from which data is read from and to which data is written to, respectively. The data transfer may continue until all data required to complete the transfer has been received by second slave device 23.

Figure 3:
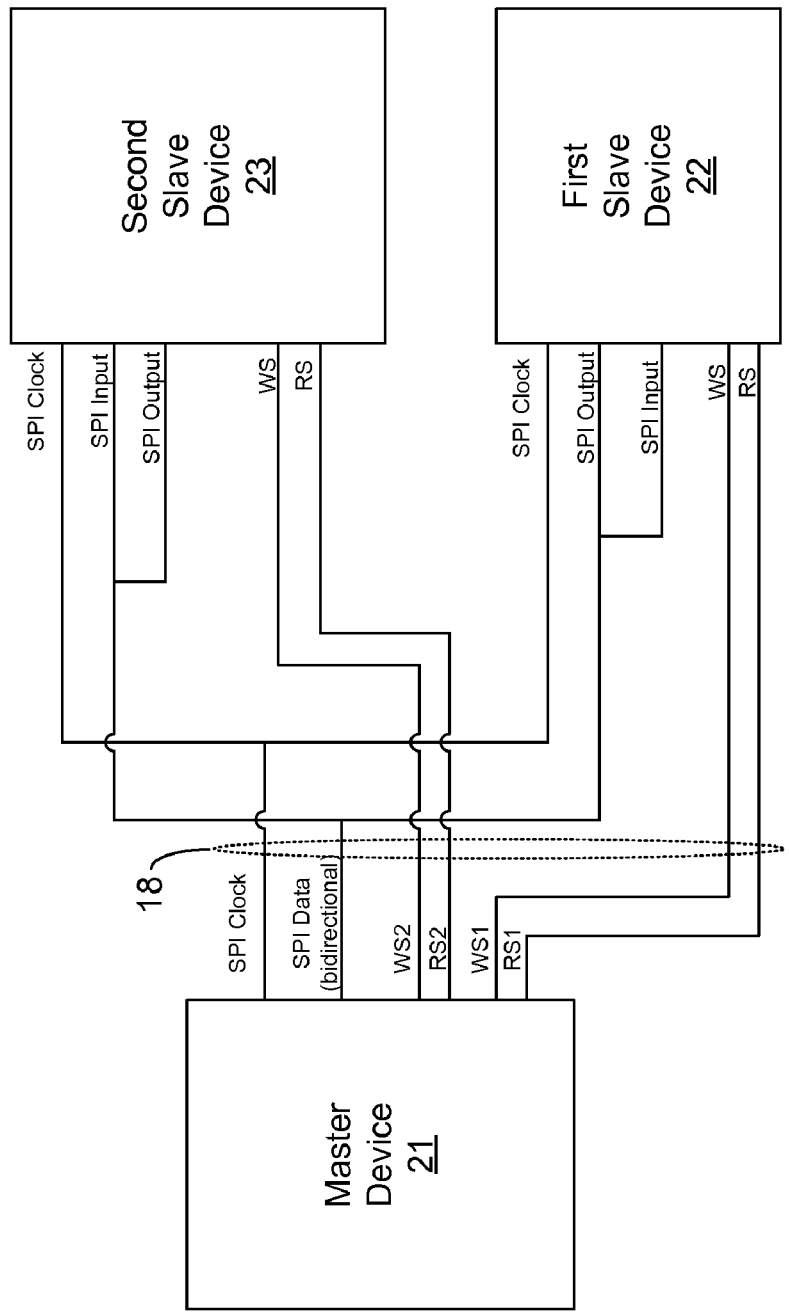
FIG. 3 is a block diagram of another embodiment of an arrangement of a master device and two slave devices are coupled to a peripheral bus.

FIG. 3 is a block diagram of another embodiment of an arrangement of a master device and two slave devices are coupled to a peripheral bus. In contrast to the embodiment of FIG. 2, wherein second slave device 23 was configured for receiving but not for providing data, second slave device 23 in this embodiment is configured for both receiving and providing data (i.e. includes an SPI input and an SPI output pin in this embodiment). Accordingly, in order to prevent contention on the data line (i.e. in order to prevent both first slave device 22 and second slave device 23 from attempting to concurrently provide data on the data line), additional enable signals may be required in order to enable data transfers between the slave devices as described herein.

In this particular embodiment, both first slave device 22 and second slave device 23 each include a read select input (RS) and a write select input (WS). In order for a respective slave device to receive data in this embodiment, its write select input must be asserted, otherwise data present on the SPI data line is ignored. In order for a respective slave device to provide data onto the SPI data line in this embodiment, its respective read select input must be enabled, otherwise its respective SPI output is tri-stated. Accordingly, master device 21 in this embodiment may select a particular one of the slave devices if that slave device is to provide data, while the read select input of other slave devices coupled to peripheral bus 18 may be de-asserted, thereby resulting in the tri-stating of their respective SPI outputs. Furthermore, the respective read select inputs of all slave devices coupled to peripheral bus 18 may be de-asserted when master device 21 is providing data onto the SPI data line. Master device 21 may also assert the write select input of any slave device coupled to peripheral bus 18 if that slave device is to receive data. Moreover, master device 21 may assert the write select input for multiple slave devices in instances wherein more than one slave device is to receive data.

Thus, in order to perform the transfer of data from first slave device 22 to second slave device 23 in the embodiment of FIG. 3, master device 21 may be configured to assert a read select signal to first slave device 22 and a write select input for second slave device 23. As such, first slave device 22 will be enabled to provide data from its SPI output pin (i.e. data can be read from first slave device 22 when its read select input is asserted), while second slave device 23 will be enabled to receive data (i.e. data can be provided to second slave device 23 through its SPI input), while its SPI output will be tri-stated, since its read select input will be de-asserted in this situation. This configuration may be reversed as well if it is desired to transfer data from second slave device 23 to first slave device 22. Once master device 21, first slave device 22, and second slave device 23 are configured for a data transfer from one slave device to another, the data transfer may proceed in the manner described above.

Figure 4:
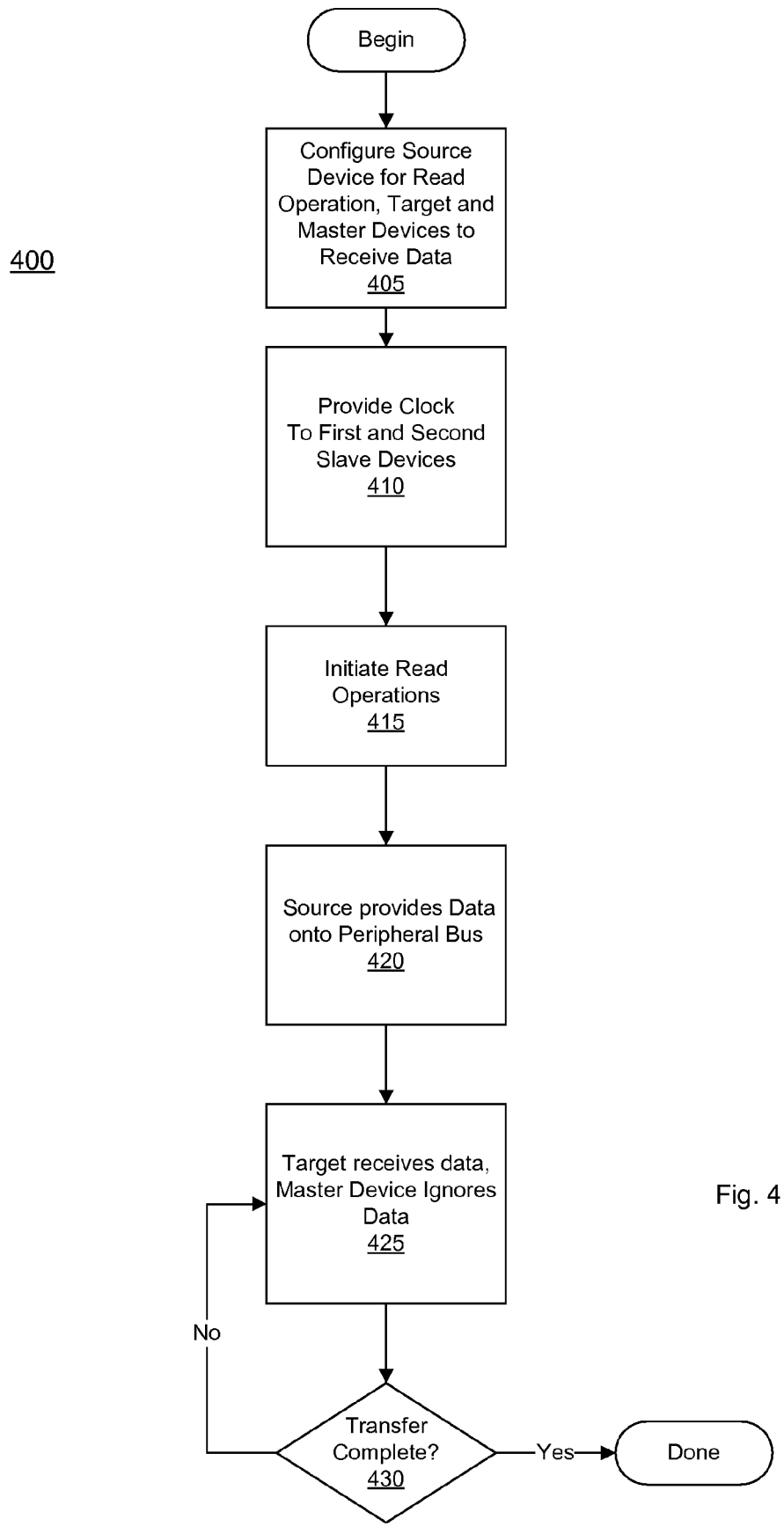
FIG. 4 is a flow diagram of one embodiment of a method for transferring data between a two slave devices on a peripheral bus under control of a master device, wherein the master device is not required to read or write the data.

FIG. 4 is a flow diagram of one embodiment of a method for transferring data between a two slave devices on a peripheral bus under control of a master device, wherein the master device is not required to read or write the data. In the embodiment shown, method 400 begins with a master device configuring itself, a source slave device (from which data is to be provided) and a target slave device (to which data is to be provided) (block 405). More particularly, the master device may configure the source device for a read operation, i.e. the source device is to provide the data that is to be transferred. The target device and may be configured for to receive data. Configuring the slave devices in this manner may include providing one or more commands over peripheral bus 18, and may also include sending a starting read address to the source device and a starting write address to the target device. The master device may also configure the slave devices involved in the data transfer to automatically increment their respective read and write addresses as the data is transferred. This may obviate the need for the master device to provide these addresses for each unit of data (e.g., each data word) that is transferred. It should be noted that more than one target slave device may be selected in some embodiments.

In addition to configuring the slave devices as described above, the master device is also configured to provide a clock signal to the slave devices (block 410). The clock signal is used to synchronize the transfer of data onto the bus, and thus between the devices coupled to the bus. The clock signal may also be used to synchronize the transfer of other information on the bus, e.g., commands, addresses, and so forth.

With the source and target slave devices configured and the clock signal provided, the master device may initiate the read operation of the first slave device (block 415). With the read operation initiated, transfer of data onto the bus from the source slave device, and thus between the source and target slave devices, begins (block 420).

When data is transferred onto the bus from the source slave device, the target slave device receives that data in accordance with it being configured to do so by the master device. Thus, data is therefore transferred from the source slave device to the target slave device. In effect, a write operation is performed on the target slave device, with the data written thereto being provided from the source slave device. However, during the transfer of data between the source and target slave devices (in block 425), the master device ignores the data. That is, the master device performs a dummy read operation, never actually retaining or receiving the data transferred from the first slave device to the second slave device in response to its read operation. Accordingly, the method described herein may allow for the transfer of data from one slave device to another slave device in a more efficient manner. Whereas prior art embodiments may require that data be transferred first from a source device to a buffer in the master device, and subsequently from the master device to the target device, this method may allow for data transfer directly from one slave device to another slave device over an SPI bus.

The data transfer began in block 425 will continue until the data transfer is complete (block 430, yes). If additional data is required to be transferred (block 430, no), the data transfer continues.

While the various embodiments discussed above have been described in reference to an SPI bus, it should be noted that the scope of the disclosure is not so limited. The method of data transfer described herein may apply to any bus to which a master device and multiple slave devices may be coupled.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An electronic system comprising:
   a master device;
   a first slave device coupled to the master device by a peripheral bus; and
   a second slave device coupled to the master device and the first slave device by the peripheral bus;
   wherein the master device is configured to:
      configure the first slave device as a source for a read operation, wherein, in configuring the first slave device, the master device is configured to provide a beginning read address to the first slave device;
      configure the second slave device as a target for a write operation, wherein, in configuring the second slave device, the master device is configured to provide a beginning write address to the second slave device;
      provide a clock signal to both the first slave device and the second slave device; and
      initiate a read operation of the first slave device, wherein initiating a read operation causes the first slave device to provide data onto the peripheral bus;
   wherein, responsive to the master device initiating the read operation, the second slave device is configured to receive the data provided on the peripheral bus by the first slave device, wherein the first slave device is configured to automatically increment read addresses and wherein the second slave device is configured to automatically increment write addresses; and
   wherein the master device is configured to ignore the data provided on the peripheral bus by the first slave device.

2. The electronic system as recited in claim 1,
   wherein the second slave device includes an output pin that is separately enabled from the input pin;
   wherein the second slave device is configured to inhibit its output pin during the read operation.

3. The electronic system as recited in claim 1, wherein the first slave device and the second slave device each include a bi-directional data pin, and wherein the bi-directional data pin of the first slave device is coupled to the bi-directional pin of the second slave device by a bi-directional data line on the bus.

4. The electronic system as recited in claim 1, wherein, during transfer of data from the first slave device to the second slave device, the master device and the second slave device operate in an input mode, and wherein the first slave device operates in an output mode.

5. The electronic system as recited in claim 1, wherein the peripheral bus is a serial peripheral interface (SPI) bus.

6. The electronic system as recited in claim 1, wherein the first slave device is a flash memory device and wherein the second slave device is a display device.

7. The electronic system as recited in claim 1, wherein the master device is a keyboard controller.

8. A method for performing data transfer in a system comprising a master device, a first slave device, and a second slave device coupled together by a peripheral bus, the method comprising:
   configuring, by the master device, the first slave device as a source of data for a read operation;
   configuring, by the master device, the second slave device as a target for performing a write operation;
   providing a clock signal to the first slave device and the second slave device, wherein the clock signal is provided by the master device;
   initiating, by the master device, a read operation of the first slave device;
   the first slave device providing data onto the peripheral bus in response to the read operation initiated by the master device;
   the second slave device receiving the data provided on the peripheral bus by the first slave device responsive to the master device initiating the read operation;
   the first slave device automatically incrementing read addresses;
   the second slave device automatically incrementing write addresses; and
   wherein the master device is configured to ignore the data provided on the peripheral bus by the first slave device.

9. A method performed by a master device for performing data transfer in a system comprising the master device, a first slave device, and a second slave device coupled together by a peripheral bus, the method comprising:
   configuring the first slave device as a source of data for a read operation, wherein said configuring the first slave device comprises providing a beginning read address to the first slave device and configuring the first slave device to automatically increment read addresses;
   configuring the second slave device as a target for performing a write operation, wherein said configuring the second slave device comprises providing a beginning write address to the second slave device and configuring the second slave device to automatically increment write addresses;
   providing a clock signal to the first slave device and the second slave device, wherein the clock signal is provided by the master device;
   initiating a read operation of the first slave device, wherein the read operation causes the first slave device to provide data onto the peripheral bus;
   wherein, responsive to the master device initiating the read operation, the second slave device receives the data provided on the peripheral bus by the first slave device; and
   wherein the master device is configured to ignore the data provided on the peripheral bus by the first slave device.

10. The method as recited in claim 9,
    wherein the peripheral bus is a serial peripheral interface (SPI) bus; and
    wherein the master device is a keyboard controller.

11. A master device which is operable to configure a data transfer between a first slave device and a second slave device, comprising:
    a bus interface for coupling to a peripheral bus, wherein the first slave device and the second slave device are coupled to the peripheral bus;
    a processor;

a memory medium coupled to the processor which stores program instructions executable by the processor to:

configure the first slave device as a source for a read operation, wherein, in configuring the first slave device, the master device is configured to provide a beginning read address to the first slave device, and wherein, in configuring the first slave device, the master device is operable to configure the first slave device to automatically increment read addresses;

configure the second slave device as a target for a write operation wherein, in configuring the second slave device, the master device is configured to provide a beginning write address to the second slave device, and wherein, in configuring the second slave device, the master device is operable to configure the second slave device to automatically increment write addresses;

provide a clock signal to both the first slave device and the second slave device; and initiate a read operation of the first slave device, wherein initiation of the read operation causes the first slave device to provide data onto the peripheral bus;

wherein configuration of the second slave device causes the second slave device to be configured to receive the data provided on the peripheral bus by the first slave device responsive to the master device initiating the read operation; and wherein the master device is configured to ignore the data provided on the peripheral bus by the first slave device.

12. A computer-readable memory medium comprised on a master device, wherein the master device couples through a peripheral bus to a first slave device and a second slave device, wherein the computer-readable memory medium stores program instructions executable by a processor to:

configure the first slave device as a source for a read operation, wherein, in configuring the first slave device, the program instructions are executable to provide a beginning read address to the first slave device, and wherein, in configuring the first slave device, the program instructions are executable to configure the first slave device to automatically increment read addresses;

configure the second slave device as a target for a write operation, wherein, in configuring the second slave device, the program instructions are executable to provide a beginning write address to the second slave device, wherein, in configuring the second slave device, the program instructions are executable to configure the second slave device to automatically increment write addresses;

provide a clock signal to both the first slave device and the second slave device; and initiate a read operation of the first slave device, wherein initiation of the read operation causes the first slave device to provide data onto the peripheral bus intended for the master device;

wherein configuration of the second slave device causes the second slave device to be configured to receive the data provided on the peripheral bus by the first slave device responsive to the master device initiating the read operation; and wherein the master device is configured to ignore the data provided on the peripheral bus by the first slave device.

\* \* \* \* \*